United States Patent [19]
Beck

[11] 4,086,202
[45] Apr. 25, 1978

[54] NON-AQUEOUS POLYMERIC DISPERSION AND MATTE COATINGS PRODUCED THEREFROM

[75] Inventor: Charles K. Beck, Mentor, Ohio

[73] Assignee: Addressograph Multigraph Corporation, Cleveland, Ohio

[21] Appl. No.: 709,962

[22] Filed: Jul. 30, 1976

[51] Int. Cl.² .................. B32B 27/06; B32B 27/30; C08K 5/05; C08K 5/06
[52] U.S. Cl. .................. 260/33.2 R; 260/33.4 R; 428/463; 428/522
[58] Field of Search .................. 260/33.2 R, 33.4 R; 428/522

[56] References Cited

U.S. PATENT DOCUMENTS

| 2,643,982 | 6/1953 | Riley | 260/32.8 |
| 3,305,513 | 2/1967 | Gander | 260/33.2 |

FOREIGN PATENT DOCUMENTS

| 837,227 | 6/1960 | United Kingdom | 260/33.2 R |

Primary Examiner—Stanford M. Levin
Attorney, Agent, or Firm—Michael A. Kondzella

[57] ABSTRACT

A non-aqueous polymeric dispersion of an acrylic or methacrylic polymer in a non-aqueous continuous phase having a hydrogen bonding index, $\delta$, greater than 10, a dipole moment, $\mu$, between 0.5 and 2.5 and a solubility parameter, $\delta$, less than 8 dries to produce a matte or low gloss coating.

8 Claims, No Drawings

NON-AQUEOUS POLYMERIC DISPERSION AND MATTE COATINGS PRODUCED THEREFROM

BACKGROUND OF THE INVENTION

This invention relates to matte or low gloss coatings. In one of its more particular aspects this invention relates to coatings prepared from non-aqueous dispersions of acrylic polymers.

Acrylic polymers such as polymers of lower alkyl acrylates and lower alkyl methacrylates and copolymers thereof are widely used in a variety of coatings applications. Aqueous emulsions of acrylic polymers dry to produce a generally glossy coating and consequently are used in semigloss emulsion paints. Acrylic are also used in heat-resistant and fumeproof enamels and in fluorescent coatings.

SUMMARY OF THE INVENTION

Matte coatings, that is, coatings which are essentially non reflecting in the specular direction, can be produced from non-aqueous dispersions of acrylic or methacrylic polymers in which the continuous phase has a hydrogen bonding index, $\beta$, greater than 10, a dipole moment, $\mu$, between 0.5 and 2.5, and a solubility parameter, $\delta$, less than 8.

DESCRIPTION OF THE PREFERRED EMBODIMENT

The dispersions of this invention can be prepared using a wide variety of acrylic and methacrylic polymers. For example, polymethyl methacrylate and copolymers of methyl methacrylate and other lower alkyl methacrylates can be used. Especially preferred are co-polymers of alkyl methacrylates and alkyl acrylates. For example, a co-polymer of methyl methacrylate, butyl acrylate and butyl methacrylate has been found particularly useful. Similarly co-polymers of methyl methacrylate and butyl acrylate can be used.

As the continuous phase an organic liquid having a hydrogen bonding index, $\delta$, greater than 10, a dipole moment, $\mu$, between 0.5 and 2.5 and a solubility parameter, $\delta$, less than 8 can be used. Diethyl ether, for example, one of the organic liquids which has been found useful in producing the desired non-aqueous dispersions of this invention has a hydrogen bonding index, $\delta$, of 13.0, a dipole moment, $\mu$, of the 1.2 and a solubility parameter, $\delta$, of 7.4. Other organic liquids and mixtures thereof, for example ethers and alcohols, having the requisite physicochemical parameters can also be used. For example, a mixture of di-n-butyl ether and ethanol in which the di-n-butyl ether is present in a concentration of 73 percent and ethanol is present in concentration of 27 percent, is a preferred mixture.

In formulating the non-aqueous dispersions which dry to produce the desired coatings of this invention, the disperse phase is incorporated into the continuous phase by simple mixing. The ratio of disperse phase to continuous phase is not critical. Dispersions can be prepared with low, medium or high solids content.

The non-aqueous dispersions of this invention find wide application in the preparation of non-gloss or matte coatings. For example, the non-aqueous dispersions of this invention can be used in low gloss fluorescent coatings, non-pigmented low gloss coatings, furniture finishes, coatings for airplanes or automobiles, low gloss black coatings for dark rooms, primers for aluminum, surface seals, non-reflecting glass, various laminates, matte finishes for signs, anti-static coatings, water repellent coatings, textured finishes, abrasion indicators, aerosols, playing cards, artificial leathers, high friction surfaces, caulking bases, photoresists, conductivity changing indicators, low gloss adhesives, decorative borders for shiny surfaces, protective layers and the like.

Some of the advantages of the dispersions of this invention are the fact that such dispersions are fast drying and display faster solvent release properties than normal coatings. The dispersions are capable of a high solids content at low viscosity. Upon drying the dispersions produce a uniform matte finish which adheres to many different types of surfaces. In particular such coatings adhere very well to metals such as aluminum. Another advantage of the dispersions of this invention resides in the particular materials used in the continuous phase. Ethers, for example, generally do not attack plastics and therefore the dispersions of this invention can be used upon relatively soluble plastics such as vinyls. Another advantage of this invention is that since the continuous phase is not a solvent for the polymers comprising the disperse phase, recoating a surface which has been coated with a dispersion of this invention is easily accomplished without crosslinking the initial coat, and clean-up is easily accomplished by the use of relatively mild solvents such as toluene.

A further advantage of the dispersions of this invention is their ease of preparation. All that is necessary is to add the disperse phase to the continuous phase and mix the two phases until the disperse phase is thoroughly dispersed within the continuous phase. No particular conditions of pressure, temperature or relative humidity are required for preparing excellent dispersions in accordance with this invention.

This invention will be better understood by reference to the following examples which are intended for purposes of illustration and are not to be construed as limiting the scope of the instant invention which is defined in the claims appended hereto.

EXAMPLE 1

A mixture of 320.1 grams of ACRYLOID B 48N, 100%, a co-polymer of methyl methacrylate, butyl acrylate, and butyl methacrylate manufactured by Rohm and Haas Company, and 1142.8 grams of diethyl ether was mixed until the polymer was thoroughly dispersed in the diethyl ether. A coating of this dispersion upon an aluminum surface dried to a uniform matte finish.

EXAMPLE 2

A mixture of 38.6 grams of ACRYLOID B 48N, 100%, 114.8 grams of di(n-butyl) ether and 41.6 grams of denatured ethanol manufactured as Proprietary Solvent No. III (anhydrous) by U.S.I. Chemicals, were mixed in a container using a propeller mixer until the polymer was thoroughly dispersed in the solvent mixture. The resulting dispersion was coated upon a wood surface and dried to a non-glossy matte finish.

Since the foregoing description and drawings are merely illustrative, the scope of protection of the invention has been more broadly stated in the following claims, and these should be liberally interpreted so as to obtain the benefits of all equivalence to which the invention is fairly entitled.

I claim:

1. A non-aqueous dispersion, which has the property of drying to a uniform matte finish upon application to a surface, consisting essentially of a co-polymer of an alkyl methacrylate and an alkyl acrylate and an organic liquid having a hydrogen bonding index, $\delta$, greater than 10, a dipole moment, $\mu$, between 0.5 and 2.5, and a solubility parameter, $\delta$, less than 8, said co-polymer being the disperse phase and said organic liquid comprising a member selected from the group consisting of ethers and alcohols and constituting the continuous phase of the non-aqueous dispersion.

2. A dispersion according to claim 1 wherein the disperse phase is a co-polymer of methyl methacrylate and butyl acrylate.

3. A dispersion according to claim 1 wherein the disperse phase is a co-polymer of methyl methacrylate, butyl methacrylate and butyl acrylate.

4. A dispersion according to claim 1 wherein the continuous phase is diethyl ether.

5. A dispersion according to claim 1 wherein the continuous phase is a mixture of an ether and an alcohol.

6. A dispersion according to claim 1 wherein the continuous phase is a mixture of di-n-butyl ether and ethanol.

7. A dispersion according to claim 1 wherein the continuous phase is a mixture of 73 percent by weight of di-n-butyl ether and 27 percent by weight of ethanol.

8. A non-pigmented matte coating produced by applying a dispersion according to claim 1 to a surface and allowing the dispersion to dry thereon.

* * * * *